No. 842,540. PATENTED JAN. 29, 1907.
C. R. FLEMING.
COMBINED FISHING FLOAT AND LINE HOLDER.
APPLICATION FILED JUNE 12, 1906.

Witnesses:

Inventor;
Charles R. Fleming.

UNITED STATES PATENT OFFICE.

CHARLES R. FLEMING, OF LOS ANGELES, CALIFORNIA.

COMBINED FISHING-FLOAT AND LINE-HOLDER.

No. 842,540.

Specification of Letters Patent.

Patented Jan. 29, 1907.

Application filed June 12, 1906. Serial No. 321,411.

*To all whom it may concern:*

Be it known that I, CHARLES R. FLEMING, a citizen of the United States, residing at Los Angeles, in the county of Los Angeles and State of California, have invented a new and useful Combined Fishing-Float and Line-Holder, of which the following is a specification.

This invention relates to fishing-floats; and the main object of the invention is to provide a fishing-float which is adapted to be used as a float and as a receptacle for the fishing line, hooks, sinkers, &c.

Another object is to provide the device with means allowing the line to be orderly or compactly reeled or wound in its receptacle, so that space is economized, permitting the housing of a long line and preventing entangling thereof.

Another object is to provide means for quickly and securely detachably fastening the line to the float without resorting to knots or loops, &c., enabling the float to be quickly placed in position on the line or shifted from one position to another on the line or quickly removed therefrom, as desired, said means also serving to help hold the separable parts of the float together.

Figure 1:
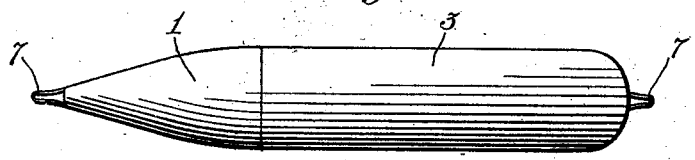
Figure 2:
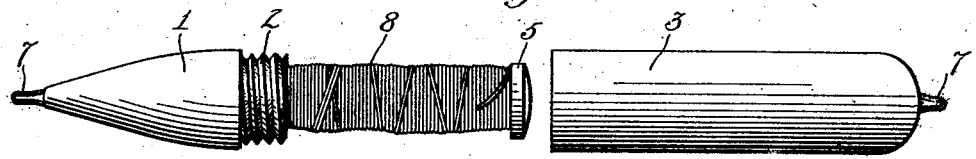
Figure 3:
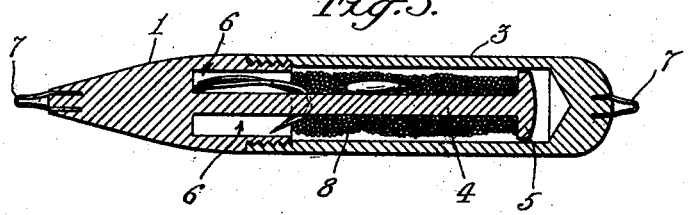
Figure 4:
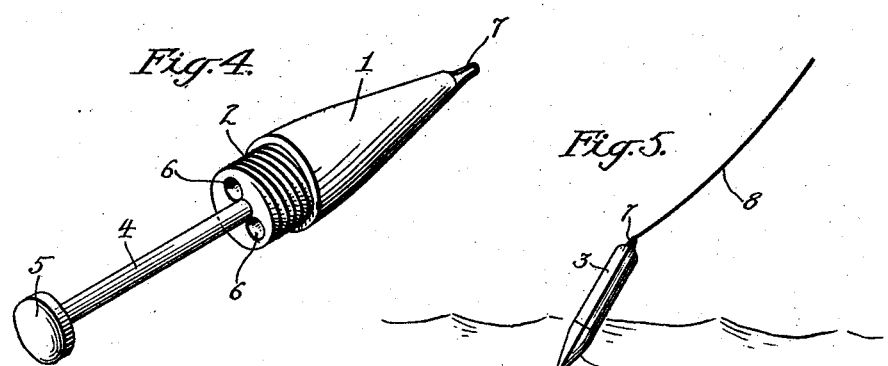
Figure 5:
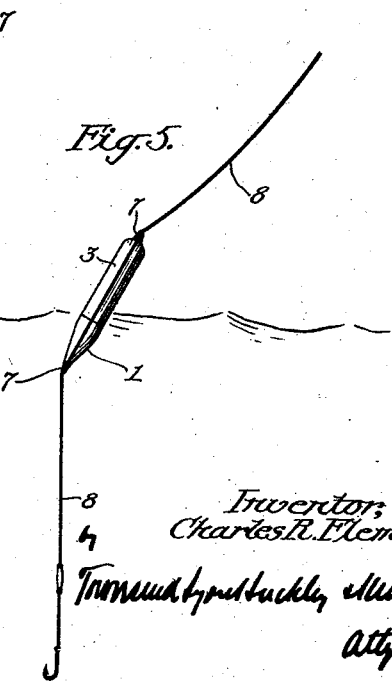

The accompanying drawings illustrate the invention, and, referring thereto, Figure 1 is a side elevation of the device. Fig. 2 is a side elevation of the device with the cap removed, showing a line coiled in place on the spindle. Fig. 3 is a longitudinal section taken diametrically through the device, showing the line and hook housed therein. Fig. 4 is a perspective in detail of the body and spindle portion of the device. Fig. 5 is a general view illustrating the device in use as a float.

The device comprises a conical body portion 1, provided with a threaded extension 2, on which is adapted to be screwed an elongated hollow cylindrical cap 3. If desired, the extension 2 may be formed plain without the threads, in which case the threads on the cap 3 will also be dispensed with; but it is preferred to screw the two parts together, as they are thus more securely held. The body portion 1 is provided with a spindle 4, having a head 5. The spindle 4 is preferably formed integrally with the body 1 and projects centrally into the cap 3 when the latter is in position, the head 5 lying near the end of the cap 3. The body portion 1 is provided with a plurality of pockets 6, which are shown as cylindrical recesses extending parallel with the spindle 4 and having a depth sufficient to accommodate tackle, such as sinkers, or hooks, or the like.

The pointed end of the body portion 1 is provided with a wire loop 7, while the head of the cap 3 is provided with a similar loop, each loop comprising a staple, as shown, which is driven into place, and the exposed portion of the staple being bent or gradually contracted or tapered toward its outer end, so as to form a wedge-shaped opening.

When the device is to be used as a float, the cap is screwed to the body 1 and the line 8 is threaded through the loops 7 and lies along the side of the float. After the line has been threaded through the loops by stretching the line from points beyond each loop the line is wedged into or pinched by the respective loops, so that the line is securely clamped by each loop, thus firmly holding the float in position on the line. Moreover, the two parts of the float are held together by the line, and it will thus be seen that it is not essential that the two parts of the float be screwed together. The line can be quickly freed from each loop by pushing it toward the large part of the loop, and thus the float can be shifted along to adjust it to any desired position on the line or removed therefrom altogether. This construction provides for quickly attaching the float in place or removing it from the line and obviates the loss of time which is required in fastening the float in place by knotting the line.

When the line is not in use, it can be wound on the spindle 4, as indicated, the hook of the line, or rather the shank of the hook, can be placed in one of the pockets 6 and the point and barb of the hook may lie in the opposite pocket, so that the hook is housed, and there is no danger of catching the line on the sharp point or barb of the hook when winding the line on the spindle. After the line has been wound, as indicated in Fig. 2, the cap 3 may be screwed in place, as indicated in Figs. 1 and 3, and the device can then be handled with impunity without kinking the line or entangling it or catching the hook. The device is so formed that it may readily be carried in the pocket of the fisherman and presents a smooth exterior of attractive appearance.

It is obvious that extra hooks or sinkers can be carried in the pockets 6, and this extra tackle need not, of course, be removed from the device when it is being used as a float, as their weight ordinarily would not exceed the buoyancy of the float.

What I claim is—

1. A combined fishing-float and line-holder comprising a closed hollow float formed of two concentric detachable parts, a spindle carried by one part only and projecting into the other part when said parts are together, the spindle being adapted to have the fishing-line wound thereon, said parts when together completely inclosing the line and hooks.

2. A combined fishing-float and line-holder comprising a body portion with a projecting spindle, a hollow cap adapted to receive said spindle and mounted on the body portion, the body portion having a pocket adapted to receive hooks or sinkers, and means for fastening a line to the float.

3. A combined fishing-float and line-holder comprising a body portion having a projecting spindle, the spindle having a head, a hollow cap detachably mounted on the body portion and telescoping with the spindle, the body portion having a wedge-shaped loop adapted to pinch the line, the cap having a similar loop.

4. A combined fishing-float and line-holder comprising a body portion with a projecting spindle upon which the line is adapted to be wound, the spindle having a head on its end, a hollow elongated cap screwed to the body portion, the body portion having a plurality of pockets extending longitudinally thereof and adapted to receive and house hooks, sinkers, &c., and means on the body portion and cap for detachably fastening the line thereto.

In testimony whereof I have hereunto set my hand, at Los Angeles, California, this 6th day of June, 1906.

CHARLES R. FLEMING.

In presence of—
GEORGE T. HACKLEY,
FRED A. MANSFIELD.